Oct. 18, 1955  F. G. THANNHAUSER  2,720,931
ENGINE MOUNTING IN CAB TYPE VEHICLE
Filed Aug. 15, 1951  2 Sheets-Sheet 2

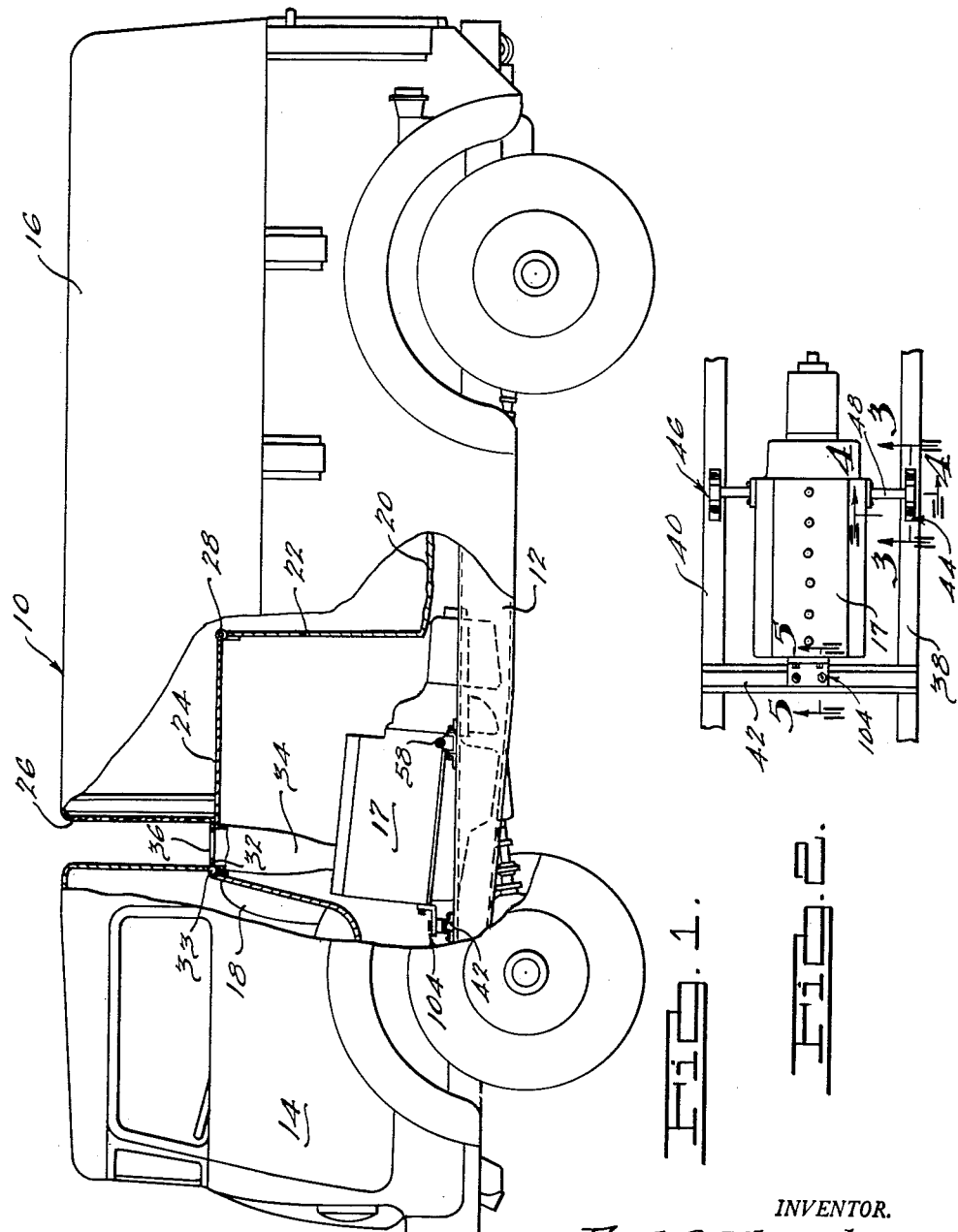

INVENTOR.
Fred G. Thannhauser.
BY Harness and Harris
ATTORNEYS.

# United States Patent Office 2,720,931
Patented Oct. 18, 1955

2,720,931

ENGINE MOUNTING IN CAB TYPE VEHICLE

Fred G. Thannhauser, Detroit, Mich., assignor to Chrysler Corporation, Highland Park, Mich., a corporation of Delaware Application August 15, 1951, Serial No. 241,940

5 Claims. (Cl. 180—89)

This invention relates to motor vehicles and more particularly to an improved arrangement of the power plant mounting with the motor vehicle body and frame portions. This invention has particular reference to a type of vehicle employing a cab ahead of engine construction where the engine is mounted on the frame structure at a location in back of the seat in the cab of the vehicle.

A principal object of my invention is to provide an improved vehicle construction including a novel arrangement of the vehicle parts.

Another object of my invention is to provide a vehicle with a power plant mounting which facilitates convenient and rapid engine removal.

A further object of my invention is to provide a power plant mounting of the type which is especially adaptable for mounting engines within small spaces.

Another object of my invention is to provide an improved power plant mounting which is simple in construction as well as economical to manufacture.

The invention comprises a vehicle having a frame structure with the vehicle cab mounted forwardly thereof, the load carrying compartment mounted rearwardly thereof, and an engine compartment disposed therebetween. The novel engine mounting and arrangement of the vehicle parts permits fast installation and removal of the vehicle engine as well as servicing.

Other objects and advantages will become more apparent from the following description of one embodiment of my invention, reference being had to the accompanying drawings in which:

Fig. 1 is a side elevational view of a vehicle having a portion broken away to illustrate my invention.

Fig. 2 is a plan view of the power plant and its associated parts shown in Fig. 1.

Figure 3:
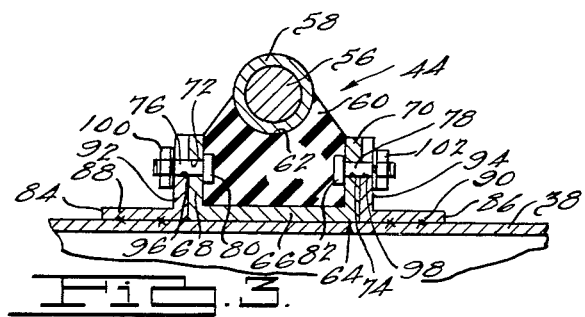
Fig. 3 is a sectional view of a said power plant mounting taken on the line 3—3 of Fig. 2.
Figure 4:
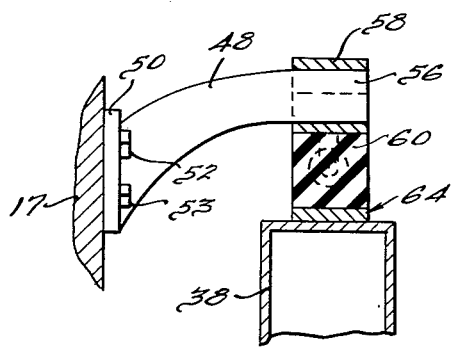
Fig. 4 is a sectional view of the same mounting taken on the line 4—4 of Fig. 2.
Figure 5:
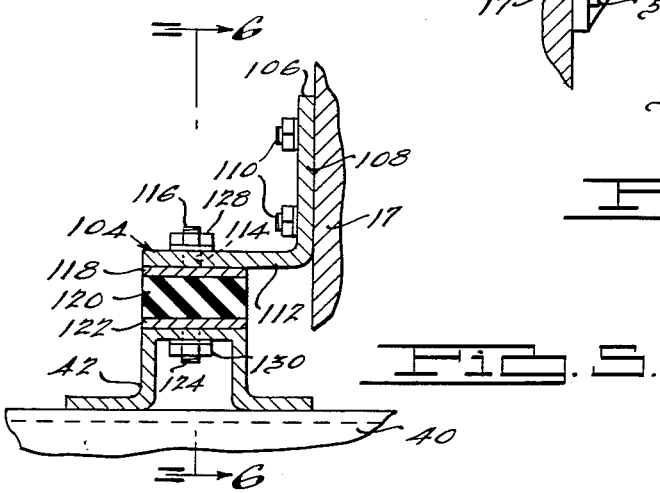
Fig. 5 is a sectional view of the front power plant mounting taken on the line 5—5 of Fig. 2.
Figure 6:
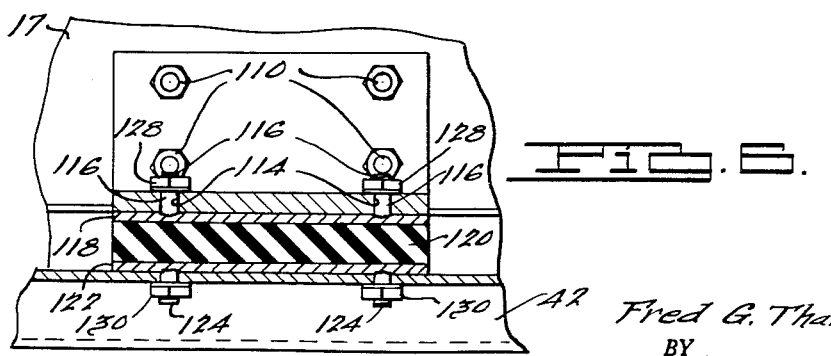
Fig. 6 is a sectional view taken on the line 6—6 of Fig. 5.

In the drawings, I have shown a motor vehicle, generally designated by the numeral 10, comprising a frame structure 12 having a cab 14 mounted at the forward end of the vehicle and a cargo carrying portion 16 mounted at the rear end of the vehicle. A power plant or engine 17 is mounted on the frame structure between the cab 14 and the cargo carrying portion 16 at a location substantially rearwardly of a seat 18 located within the cab 14. The cargo carrying portion 16 is provided with a floor 20, a vertical wall 22 as well as a swingable floor 24 which, with a canvas covering 26, forms a space above the engine 17. The floor 24 is hinged at 28 so that it may be retracted rearwardly of the vehicle to permit installation and removal of the engine. The floor 24 is communicatably connected with the cab 14 by a panel 32 which is swingably connected to a hood 34 by the hinge 33 for supplying air to the power plant through grille work 36 disposed in the panel. The panel 32 may be removed when it becomes necessary to install or remove the engine. The engine 17 is mounted on the frame structure 12 at three locations, two being on side rails 38 and 40, the other being on cross member 42 which is connected between side rails 38 and 40. The mountings on the side rails 38 and 40 are generally indicated by the numerals 44 and 46, respectively, are disposed substantially midway of the engine 17 and are identical. For this reason, the description of the side mountings will be directed to mounting 44, it being understood that a like description applies to mounting 46.

Mounting 44 comprises a bracket 48 having a mounting portion 50 bolted to the engine block of the power plant by bolts 52 and 53. The remaining portion of the bracket 48 extends outwardly from the power plant and its outer extremity is of cylindrical cross sectional configuration forming a trunnion 56. The trunnion 56 extends to a location substantially over the side rail 38 and is received within a metal sleeve 58. The metal sleeve 58 is bonded to a rubber-like yieldable member 60 which is provided with a semi-cylindrical surface 62 for receiving the sleeve 58. The lower portion of the yieldable member 60 is bonded to a U-shaped bracket 64 which has a relatively long bite portion 66 and relatively short leg portions 68 and 70. The legs 68 and 70 are provided with openings 72 and 74 of square cross sectional configuration which receive bolts 76 and 78 therein, respectively. The bolts 76 and 78 are provided with head portions 80 and 82, respectively, are disposed between the legs 68 and 70 and are bonded to the yieldable member 60. The bolts 76 and 78 are provided with portions adjacent the heads 80 and 82 of square cross sectional configuration which fit into the square holes 72 and 74 to thereby hold the bolts 76 and 78 against rotation. The mounting 44 is also provided with spaced L-shaped brackets 84 and 86 which have horizontal legs 88 and 90 welded to the upper horizontal surface of the side rail 38. The brackets 84 and 86 are also provided with vertically extending legs 92 and 94 which have slots 96 and 98 therein, respectively. The slots 96 and 98 extend downwardly from the tops of the legs 92 and 94, respectively, and the legs 92 and 94 are spaced a predetermined amount equal substantially to the length of the U-shaped bracket 60. According to my invention the U-shaped bracket 60 may be placed on the side rail 38 between the brackets 84 and 86 so that the bolts 76 and 78 extend into the slots 96 and 98, respectively. The bolts 76 and 78 are provided with nuts 100 and 102 which when tightened down secure the U-shaped bracket 60 to the L-shaped brackets 84 and 86. The internal portion of the sleeve 58 as well as the external portion of the trunnion 56 may be treated by conventional methods to prevent rust or any other formation from forming on these surfaces which would in any way deter from the relative rotation therebetween. It will be seen that a certain amount of relative rotation between these two parts will be had during operation of the engine 17 and that a predetermined amount of relative rotation may be had when the engine 17 is removed from the vehicle in accordance with the steps hereinafter set forth.

The forward end of the engine 17 is provided with a mounting, generally designated by the numeral 104, which secures it to the cross member 42. The mounting 104 comprises an L-shaped bracket 106 having a vertical leg 108 secured by bolts 110 to the power plant and a horizontal leg 112 provided with openings 114 therein. The openings 114 receive studs 116 which extend from and are an integral part of an elongated plate 118. The plate 118 is bonded at its lower surface to the upper surface of an elongated rubber-like yieldable member 120 of rubber or similar material, the latter being bonded at its lower surface to a similar elongated plate 122. The plate 122 is provided with integral studs 124 which extend through openings 126 in the cross member 42. The mounting 104 is secured together by nuts 128 and 130 threaded on the studs 116 and 124, respectively, for a resilient mounting of the front end of the power plant.

In accordance with my invention, the engine or power plant 17 may be removed from the vehicle in accordance with substantially the following steps. The walls 24 and 26 as well as the panel 32 are pivoted upwardly and outwardly about the hinges 28 and 33, respectively, to provide an open space between the cab 14 and the wall 22 of the cargo carrying portion 16 through which the power plant is to be removed. Thereafter, all connections normally made with a power plant are removed. It has been found convenient to then remove the nuts 130 in the mounting 104 to release this mounting. At this point the power plant 18 is rotated about the mountings 44 and 46 by turning the trunnions within the sleeves until the power plant is in a substantially vertical position. It will be noted that the engine may be conveniently serviced when in this tilted position. The nuts 100 and 102 are then backed off until the bolts 76 and 78 are free to be pulled out of the slots 96 and 98 of the brackets 84 and 86, respectively. The engine may be lifted out of the vehicle by any conventional type of mechanism such as a crane or pulley system disposed above the vehicle. The engine may be installed by reversing the steps heretofore set forth.

It will be seen by employing my improved type of power plant mounting that the power plant may be disposed within the space smaller than most structures commonly found in the art. It will also be seen that the power plant may be rotated until it is in a vertical position and thereafter either withdrawn from the vehicle or secured in the vertical position to facilitate speedy servicing.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a vehicle having a frame structure and a power plant, means for mounting said power plant on said frame structure comprising a pair of trunnions mounted on opposite sides of said power plant and extending outwardly therefrom, receiving means disposed on said frame structure on opposite sides of said power plant each comprising a sleeve receiving one of said trunnions and rotatable relative thereto, a first bracket on said frame structure having a securing member extending outwardly therefrom, a second bracket secured to said frame structure having a portion for releasably securing said first bracket, and a yieldable rubber-like member bonded between said sleeve and said first bracket, and means for resiliently supporting the power plant at another location on said vehicle.

2. In a vehicle having a frame structure and a power plant, means for mounting said power plant on said frame structure comprising a pair of trunnions mounted on opposite sides of said power plant and extending outwardly therefrom, receiving means on said frame structure disposed on opposite sides of said power plant and each comprising a sleeve receiving one of said trunnions and rotatable relative thereto, a U-shaped bracket on said frame structure having securing means extending from the legs thereof, securing brackets secured to said frame structure on opposite sides of said U-shaped bracket and having portions thereon for releasably receiving said securing means on said U-shaped bracket, means fixing said U-shaped bracket to said supporting brackets, a yieldable rubber-like member bonded between said sleeve and said U-shaped bracket and means resiliently supporting said power plant at another location on said frame structure.

3. A vehicle comprising a frame structure, a cab mounted on said frame structure adjacent one end thereof, means forming a load carrying compartment mounted on said frame structure generally adjacent the other end thereof, said means and said cab each having wall portions cooperating to form an engine compartment, an engine, and a three point resilient mounting connecting said engine to said frame structure within said compartment, two of said mounting points being disposed on opposite sides of said frame structure for facilitating rotation of said engine about an axis extending transversely of said vehicle, said compartment forming means and said cab having cooperating swingably mounted members covering said engine compartment and adapted to be moved to open said engine compartment.

4. A vehicle comprising a frame structure, a cab mounted on said frame structure adjacent one end thereof, means forming a load carrying compartment mounted on said frame structure generally adjacent the other end thereof, said means and said cab each having wall portions cooperating to form an engine compartment, an engine, and a three point resilient mounting connecting said engine to said frame structure within said compartment, two of said mounting points being disposed on opposite sides of said frame structure for facilitating rotation of said engine about an axis extending transversely of said vehicle, and a grille panel swingably supported on said cab, said compartment forming means having a swingably supported member cooperating with said grille panel to form a door structure for said engine compartment.

5. In a vehicle having a frame structure and a power plant, means for mounting said power plant on said frame structure comprising first, second and third supports, said first support including cooperating support elements carried by said power plant and said frame structure, respectively, and a load transmitting resilient member connected to said support elements to transmit load therebetween, said second and third supports comprising a pair of trunnions mounted on opposite sides of said power plant and extending outwardly therefrom, receiving means on said frame structure disposed on opposite sides of said power plant each comprising a sleeve receiving one of said trunnions and rotatable thereto, a bracket secured to said frame structure and a yieldable rubber-like member bonded between said bracket and said sleeve.

References Cited in the file of this patent

UNITED STATES PATENTS

| | | |
|---|---|---|
| 1,234,854 | Barthel | July 31, 1917 |
| 1,756,913 | Schjolin | Apr. 29, 1930 |
| 1,766,925 | Moorhouse | June 24, 1930 |
| 2,001,562 | Bagley | May 14, 1935 |
| 2,095,058 | Cross | Oct. 5, 1937 |
| 2,154,011 | Reinhoel | Apr. 11, 1939 |
| 2,224,562 | Wolf | Dec. 10, 1940 |
| 2,262,467 | Ormsby | Nov. 11, 1941 |
| 2,396,506 | Harris | Mar. 12, 1946 |
| 2,564,888 | Foley et al. | Aug. 21, 1951 |

FOREIGN PATENTS

| | | |
|---|---|---|
| 132,012 | Great Britain | Sept. 11, 1919 |
| 655,489 | France | Dec. 18, 1928 |
| 906,367 | France | May 14, 1945 |